June 8, 1965 C. M. SWEET 3,187,611
LATHE WITH AUTOMATIC ADJUSTING TANDEM TOOLS
Filed May 23, 1960 3 Sheets-Sheet 1

INVENTOR.
Corliss M. Sweet

June 8, 1965     C. M. SWEET     3,187,611

LATHE WITH AUTOMATIC ADJUSTING TANDEM TOOLS

Filed May 23, 1960     3 Sheets-Sheet 2

INVENTOR.

Corliss M. Sweet.

United States Patent Office 3,187,611
Patented June 8, 1965

3,187,611
LATHE WITH AUTOMATIC ADJUSTING
TANDEM TOOLS
Corlise M. Sweet, 1000 E. Montana St., Milwaukee, Wis.
Filed May 23, 1960, Ser. No. 30,902
2 Claims. (Cl. 82—25)

This invention relates to turning in a lathe and especially to a new method of tandem turning that shows how two or more cutting elements can be arranged to adjust themselves automatically for turning different size diameters.

In my previous patent applications, Serial Number 264,548 filed January 2, 1952 and Number 654,249 filed April 22, 1957, both of which are abandoned, and Patent 3,078,547, it was shown how two or more cutting elements can be arranged to cut in tandem on one side of a workpiece. This arrangement can reduce the time of turning, increase the tool life, give a better cutting action, allow the use of harder tools, and the workpiece turned will be more uniform in size.

The tools in the above applications can be adjusted for turning one diameter, or with the two tool design they will cut a range in diameters. The range in diameters that one size of tool will cut is small for diameters of approximately three inches. As the diameters increase in size the range that a tool will cut is larger. Today there are many small parts that range in size from about two to four inches in diameter. These parts usually have several diameters. The most economical process of machining them, in small quantities, is with a tracer controlled lathe. The tracer lathe has a template that controls the position of the cutting element, as the cutting element moves from one end of the workpiece to the other end. Due to this cutting element having to cut on various size diameters the tandem tools described in the applications mentioned above are not suitable in most instances.

It is therefore an object of this invention to show a new method of tandem turning in which two or more cutting elements will automatically adjust themselves for turning different diameters.

Another object of the invention is to show how the same equipment can be used as an automatic steady rest for turning some parts.

Another object is to show how some parts can be turned and burnished, using the same equipment.

A further object is to show how harder tools, such as ceramics, can be more extensively used by the use of automatic adjusting tandem turning equipment.

In the drawings:

FIGURE 1 is a schematic side elevation of a lathe carriage looking at it from the chuck side, showing a carriage with a square turret mounted on it, a cutting element in the square turret engaged in turning a workpiece, a second cutting element at ninety degrees to the cutting element in the square turret, and a cam arrangement to adjust the top cutting element with respect to the square turret cutting element, so that both cutting elements cut on the same diameter.

Figure 1:
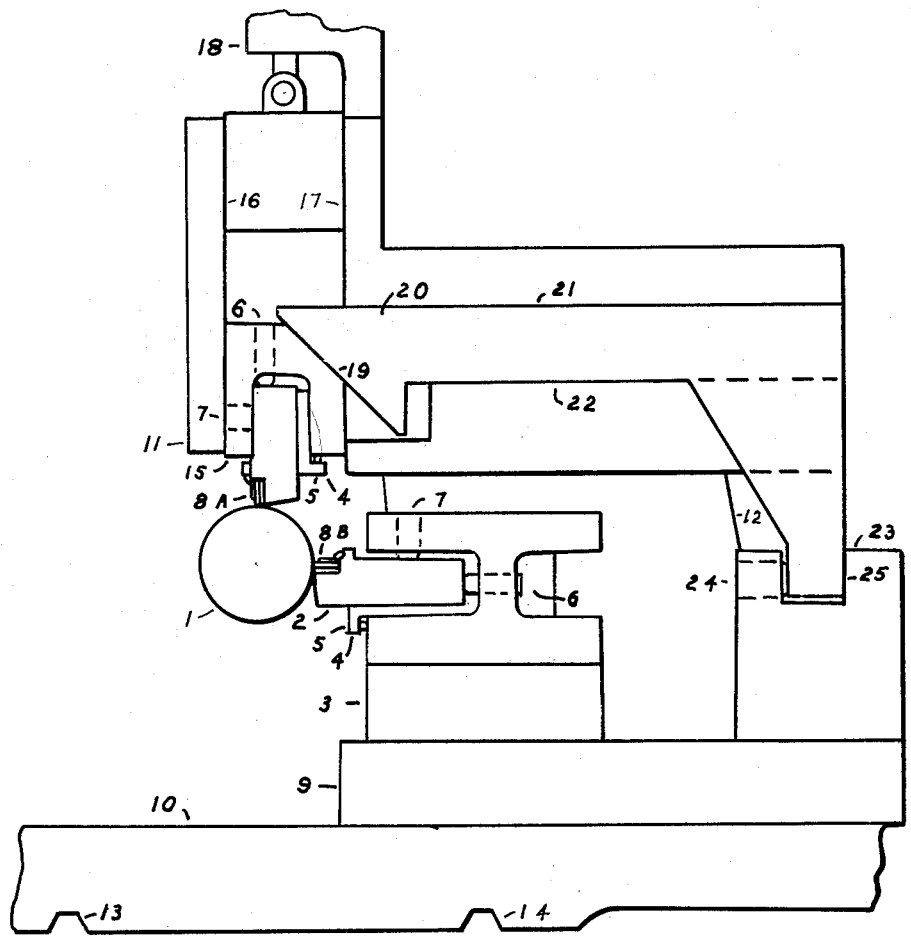
Figure 3:
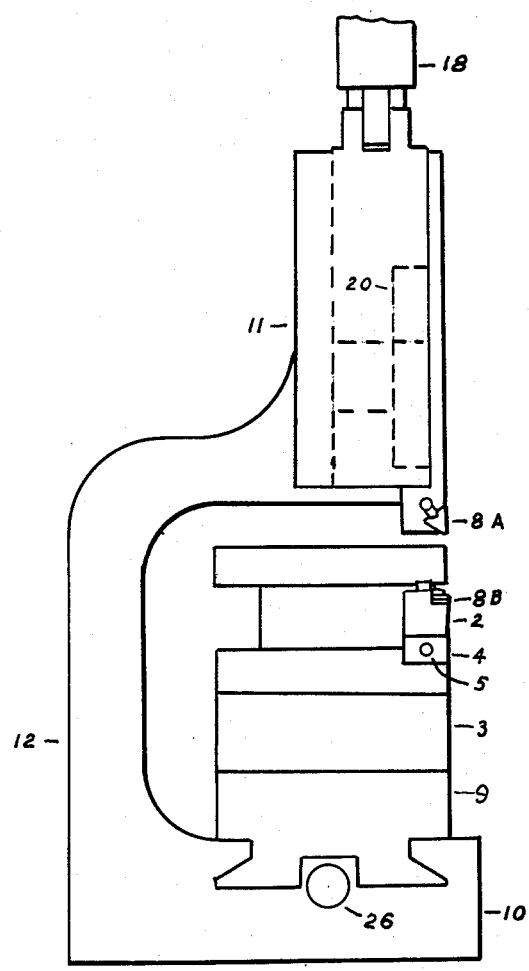
FIGURE 3 is a schematic end view of FIGURE 1 looking at it from the left hand side.

The construction in FIGURES 1 and 3 shows a device having two cutting elements positioned at ninety degrees from each other that are engaged in tandem turning a work piece 1. For simplicity purposes the covers protecting parts of the mechanism from chips are not shown. Item 2 is a cutting element located in a square turret 3. The square turret is indexed from the bottom by a lever not shown. The unusual feature of the turret is that it has a means of adjusting the cutting element endways and sideways. The means of adjusting the cutting element sideways is by block 4 that has grooves on its base and grooves on its top that are not parallel to each other. By moving block 4 in or out by screw 5 the block and the cutting element it supports move sideways. The block is described in my Patent 2,900,704. The same movement can also be obtained by a similar block shown in Patent No. 3,078,547. The endwise adjustment of the cutting element is done by screw 6. The cutting element is held down by screw 7. The screw 7 should be at a slight angle so that when the screw is tightened the rotation of its contact point with the cutting element 2 should be such that it will push the cutting element back toward screw 6. The insert cutting element 8B is a square or triangular insert that is clamped in place. 8B is similar to 8A. The A and B are added to assist in describing their positions. It is prefered that an insert cutting element always be used because when one edge becomes dull the insert can either be indexed to another cutting surface or replaced with another precision ground insert cutting element. In this way when the tools are once adjusted it is only necessary to replace the insert cutting element and no further adjustment is required until wear takes place in other parts of the equipment. The square turret 3 is mounted on slide 9 that moves laterally with the work piece axis on carriage 10. The above is similar to what has been known in the past.

Housing 11 is fastened to carriage 10 by structural means 12. The housing moves with the carriage on ways 13 and 14, but it cannot move laterally. Housing 11 holds ram 15 that slides on surface 16 and 17 and other surfaces not shown. Ram 15 is held up by air cylinder 18 that exerts a constant force to hold ram 15 against cam surface 19. Cam surface 19 is at a forty five degree angle with the carriage 10 top surface. Cam 20 slides in bearing surfaces 21 and 22, and is moved by block 23. Screw 24 holds cam 20 to surface 25 but it really is not necessary as the air cylinder 18 would hold it in place. Block 23 is fastened to slide 9 and moves forward and backward with the square turret 3. It can be seen from the above that as slide 9 moves toward the center of the workpiece both cutting elements will uniformly move toward the center of the workpiece, and as slide 9 moves away from the center of the workpiece both cutting elements will uniformly move away from the center of the workpiece. This will cause the cutting elements to cut in tandem on any diameter.

If desired structural supporting means 12 can be part of carriage 10, or it can be an attachment that can be fastened to the carriage by keys and bolts. In this way it can be removed for machining very large pieces on the lathe.

In setting cutting elements in other positions of the square turret 3, they should be set out further than the insert cutting element 8B. When the other cutting elements are set out further the upper cutting element 8A in ram 15 will not interfere with any operations such as facing, chamfering, and undercutting. When a cutoff operation is to be performed it should be done with a cutting element located on the back side of the lathe or one hundred and eighty degrees to the cutting element 8B.

It is not necessary to use a square turret with this mechanism. Using a regular tool post the upper cutting element positioning mechanism can be made much smaller. The turret was placed in the drawing to show that this mechanism does not take away from the versatility of the lathe.

The mechanism can be used with a template controlled lathe, commonly called a tracer lathe. When used with a tracer lathe part 9 should consist of two slides, one of which is operated by the tracer, and the other by the screw 26 to position the carriage laterally with the workpiece.

Figure 2:
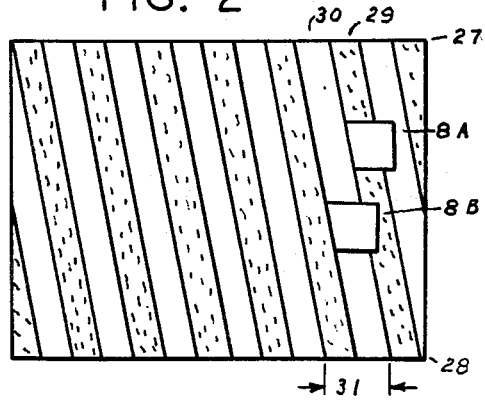
FIGURE 2 is a schematic surface development of a cylinder that is laid out on a flat surface showing the paths that two cutting elements follow when both cutting elements are cutting in tandem on the same diameter.

FIGURE 2 shows a surface development of a cylinder that is being turned. The surface development could be made into a cylinder if it was rolled up with corner 27 touching corner 28. If the surface development was rolled up it could be seen that the dotted section 29 forms a helical path around the cylinder. In between the dotted helical path is another helical path 30. Insert cutting element 8A cuts helical section 29. Insert cutting element 8B cuts helical section 30. The feed of the machine is equal to the combined widths of the helical paths 29 and 30, which is shown as 31. In order for both cutting elements to cut equally both are set to cut on the same diameter, and the cutting edge of the lower cutting element 8B is set beyond the cutting edge of the upper cutting element 8A in the direction the carriage is feeding an amount that can be calculated by the following formula.

$$\frac{\text{Machine feed}}{\text{No. of cutting elements}} = \text{machine feed} \times \frac{\text{angle between 2 cutting elements}}{360 \text{ degrees}} = \text{amount of offset of one cutting element from adjacent cutting element}$$

An example is as follows. If it is desired to have a 0.030 inch feed on each cutting element of FIGURE 1, the lathe carriage would be set for a 0.060 inch machine feed. The amount of offset of 8B from 8A would be calculated as follows.

$$\frac{0.060}{2} - 0.060 \times \frac{90}{360} = 0.015 \text{ inch}$$

From the above 8B would be set 0.015 inch beyond 8A in the direction the carriage is feeding. This setting of the cutting element could be done with a dial indicator attached to the lathe chuck or to the workpiece It follows from the above that in tandem cutting the cutting elements are not spaced evenly around a workpiece but are spaced in such a way that when applied to the following formula the answer is a quantity greater than zero.

$$\frac{\text{Machine feed}}{\text{No. of cutting elements}} - \text{machine feed} \times \frac{\text{angle between 2 cutting elements}}{360 \text{ degrees}} = \text{quantity greater than zero}$$

When the above formula is applied to cutters evenly spaced about a workpiece the quantity is zero.

In using this arrangement the operator can cut with a single cutting element at any time. All that is necessary is to change the lathe feed to an amount equal to the width of 30 or anything smaller. Then 8B will do all the cutting and 8A will just leave a mark to make the workpiece smoother.

Some people ask if the two cutting element arrangement leaves a step on the workpiece shoulder when the feed on the lathe is disengaged. The distance between the cutting elements is so small in comparison with the speed of turning that marks are not noticeable. This can be easily seen by considering the speed of the workpiece. A four inch diameter piece being cut at 250 surface feet per minute revolves at 239 revolutions per minute, which is one sixteenth of a second for the work piece to travel from cutting element 8A to 8B.

Some inventors have used tandem cutting elements on lathes but not as explained here. They set one cutting element above another cutting element in a holder in which one cutting element could not move with respect to the other cutting element, and they arranged the cutting elements so that one was cutting a diameter on the outside surface of the workpiece and the other cutting element was cutting a smaller diameter. When cutting elements are set in this fashion, the machine can not be set for cutting a feed rate greater than what a single cutting element will cut and only a slight increase in the speed can be obtained. An example is as follows. A certain type of steel workpiece can be cut with 0.030 inch feed and 0.500 inch depth of cut, with a certain type of cutting element at a surface cutting speed of 249 feet per minute. If this same cut, using the same workpiece, the same type of cutting element, and the same feed per tool was divided between two cutting elements, so that one cutting element cut one quarter inch off the outside diameter, and the other cutting element cut one quarter inch deeper, the cutting speed for the new combination would be 271 surface feet per minute. This would be removing metal at a 9% faster rate than what a single cutting element would cut taking 0.500 inch depth of cut. In the tandem tool in this application both cutting elements cut 0.500 inch deep and the machine feed would be doubled. This would be 100% increase in metal removal over a single cutting element and a 91% increase in metal removal over the method others have used.

Figure 4:
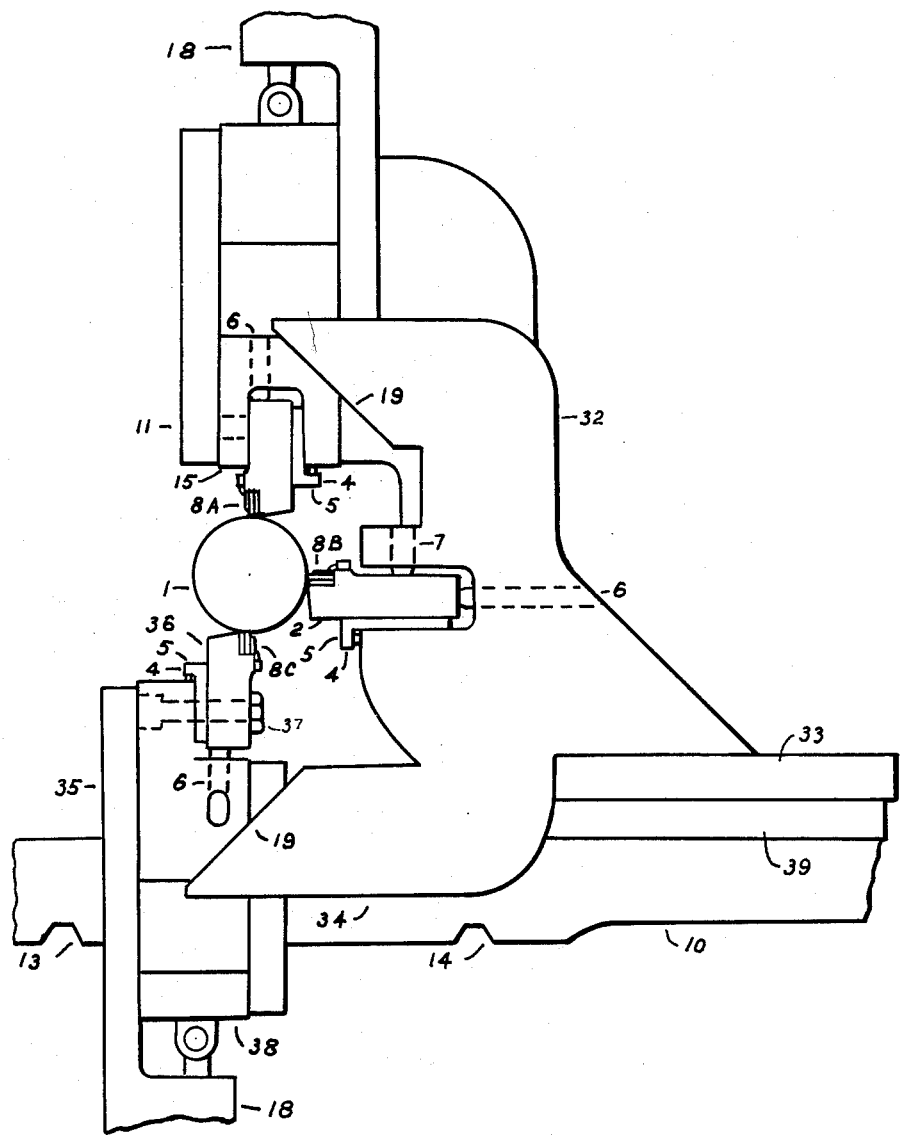
FIGURE 4 is a schematic side elevation of a lathe carriage having three tandem tools all cutting on one diameter with a cam arrangement to automatically adjust the tools for cutting different diameters, and the carriage to have a space on the back side for additional cutting elements to perform facing, grooving and cut off operations.

The construction shown in FIGURE 4 is an automatic adjusting tandem lathe turning device that is similar to the arrangement shown in FIGURES 1 and 3. The main difference is that the square turret has been removed and a third tool has been added. Therefore with this arrangement it is possible to remove metal from a workpiece three times as fast as with a single cutting element.

Other changes in the construction of FIGURE 4 from FIGURE 1 are as follows. Cam 32 is shown as part of the slide 33. This could be a one piece construction with wear plates or it could be a separate piece fastened to the slide. The cam 34 for the lower insert cutting element 8C would be similar to cam 32 except that it would be shaped different for attaching to slide 33. Housing 35 would be similar to housing 11 except that it would be shaped different for chip clearance. Cutting element 36 would be similar to 2 except that it would be slotted with a nut 37 to hold it down. Ram 38 is similar to ram 15 except that it is shaped different for chip clearance.

The arrangement shown in FIGURE 4 would be best for a controlled lathe such as a tracer or tape control. It should be noted that the back side of the lathe is open which will allow the use of other tools for cutting grooves that it is difficult to cut with a tracer control.

The operation of FIGURE 4 would be as follows. Slide 39 would be set by a screw similar to 26 in FIGURE 3 so that cutting element 8B is cutting at the correct diameter with respect to the template. The carriage 10 would move along ways 13 and 14. Slide 33 would move in and out on slide 39 and be controlled by a template not shown. As slide 33 moves toward the center of workpiece 1 insert cutting element 8B moves toward the center of workpiece 1. Simultaneously the cams 32 and 34 push insert cutting elements 8A and 8C toward the center of the workpiece so that all three cutting elements are cutting on the same diameter. The cutting edge of 8C is offset in the direction of machine feed from 8B and the cutting edge of 8B is offset from the cutting edge of 8A in the direction of feed. In this way the three insert cutting elements are each cutting separate helical sections from the workpiece and the lathe feed is set for cutting three times the feed of a single cutting element. The cutting would be similar to the cutting paths shown in FIGURE 2 with the exception there would be three paths instead of two.

Figure 5:
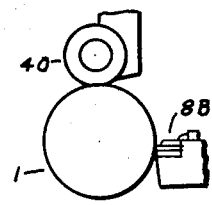
FIGURE 5 is a schematic view of a workpiece being turned with the device shown in FIGURE 1 showing how a roller can be substituted for the top cutting element to steady the work.

The schematic construction in FIGURE 5 shows a roller 40 mounted in place of insert cutting element 8A in FIGURE 1. As insert cutting element 8B moves toward and away from the workpiece 1 the roller 40 moves toward and away from the workpiece and supports it from bending. In using this device the feed will have to be slowed up when changing from one diameter to another. The reason this is necessary is that the roller is a small distance behind the cutting element, and it is necessary for the cutting element to form a surface for the roller to ride on before it can support the shaft. Instead of a roller as shown, this could be a stationary tool tipped with carbide, which could be called a back rest or a steady rest tool.

Figure 6:
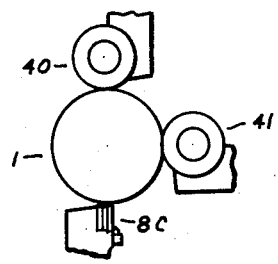
FIGURE 6 is a schematic view of a workpiece being turned with the device shown in FIGURE 4 showing how rollers can be substituted for the top and center cutting elements to act as a steady rest.

The schematic construction in FIGURE 6 shows how rollers 40 and 41 can be substituted for insert cutting elements 8A and 8B in FIGURE 4. The advantage to this is that long slim workpieces that normally have to be turned at a reduced feed or have to be placed in a steady rest can be turned at a higher feed rate. When changing from one diameter to another the machine feed will have to be reduced for a short distance to provide a new turned surface for the rollers to bear on.

Figure 7:
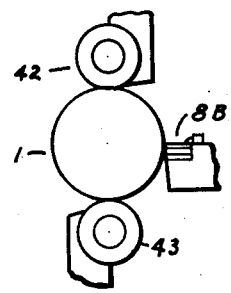
FIGURE 7 is a schematic view of FIGURE 4 showing how burnishing rollers can be substituted for the upper and lower cutting elements to provide a means of turning and burnishing the workpiece in one operation.

The schematic view in FIGURE 7 shows burnishing rollers 42 and 43 replacing insert cutting elements 8A and 8C in FIGURE 4. The advantage is the rollers will burnish the tool marks made by insert cutting element 8B and will give the workpiece a smoother surface. In this way turning and burnishing can be done in one operation. If desired the cutting element 8B could be removed and only burnishing be done. This would make the lathe a machine for automatically burnishing and work hardening workpieces that have more than one diameter.

In the above there has been shown means of automatically adjusting cutting elements to cut in tandem on different size diameters. There are other methods of doing this by gears and electrical means. It is believed that the flat cams shown as 19 is about as simple a method as can be found.

The housing 14 will not interfere in loading heavy workpieces. When workpieces that are supported on centers are loaded the carriage should be moved to the tail stock end of the lathe. The tail stock center can then protrude between the cutting elements for easy loading.

It has been shown how metal can be removed from a workpiece faster than by a single cutting element, and by previous tandem turning cutting elements that do not automatically adjust for different diameters. The other advantages of greater tool life, better cutting action, the use of harder tools, and how workpieces can be machined more uniformly will be explained below.

The cutting life of a cutting element is dependent on the temperature of the cutting edge. The hotter a cutting edge becomes the less resistance it has to wear. In many companies today the practice is to run the workpiece faster than they have in the past, as the depreciation cost on the machine is much greater than the cost of the cutting elements. Greater cutting element life can be obtained by slightly reducing the load on each cutting element. This will cause the cutting element to run cooler and it will be much more resistant to shock and wear.

In the past more tool life could have been obtained by reducing the feed on the older type of tandem cutting tools that were mentioned above. If that would have been done it would have resulted in less metal removal than for a single cutting element. An example was shown above how by using two tandem cutting elements by the older method only nine percent more metal could be recovered over what a single cutting element would cut. Therefore if the older method of tandem turning had been used with a reduced feed it would have resulted in less metal removal than could be obtained with a single cutting element. It was also shown that by using two cutting elements by the method described in this application one hundred percent more metal could be removed than by a single cutting element. Therefore using the method described in this application with about a seventy five percent load on each cutting element will result in fifty percent more metal removed for two cutting elements over what a single cutting element will cut and both cutting elements operating at seventy five percent load will be much cooler, which will result in longer tool life.

The principle of obtaining more tool life will also result in more uniform size workpieces. One method of obtaining this would be to set the lower cutting element that is 8B in FIGURE 1, so that it takes a very small cut. In this way it will not have to cut scale on a workpiece, it will not be subject to shock, it will run cooler, and therefore it will stay sharp for a longer period. This will result in the workpieces being more uniform in size, because if the cutting element does not change in size the workpiece will not change. Another method by which still greater uniformity can be obtained is by using a harder tool for 8B. Ordinarily the harder cutting elements can not be used as they break easily when subjected to shock. In this application where the cutting element can be protected from shock by cutting element 8A a harder cutting element can be used at 8B. In practice the machine operator would replace cutting element 8A at relatively short periods of time. The cutting element 8B would be replaced at much longer periods of time.

In addition to what has been said about using harder cutting elements it should be stated that cutting elements such as ceramics can be used more extensively by the methods described here. Ceramic cutting elements will cut harder steel and at a faster rate of speed than carbides. The disadvantage to ceramics is they are very brittle and will not take a shock load. When a ceramic cutting element comes to a hole in a workpiece the strain is taken off the workpiece, the workpiece backlashes, the strain is taken off the gears that advance the carriage, and the carriage tends to move the cutting element farther into the hole than it normally would. This combined action causes a shock load to the cutting element, and on brittle cutting elements, like ceramics, breaks them. The use of two cutting elements cutting in tandem reduces the shock load when one cutting element comes to a hole. When one cutting element comes to a hole the other cutting element keeps a strain on the workpiece which prevents a backlash of the workpiece, and it also prevents the carriage from pushing the cutting element farther into the hole than it should go. The result is less shock to the cutting element, and hence less breakage.

Chatter in a lathe is often caused by an uneven load on the workpiece. When the load changes due to hard spots and high spots on the workpiece, the workpiece and the lathe acts like a spring, and sets up a vibration that causes chatter. Dividing the load on the workpiece between two or more tools will make the load more uniform, and there will be less tendency for the workpiece to chatter. Making the load more uniform can reduce the size of the lathe frame for some workpieces.

Another method of obtaining better cutting action with tandem cutting tools is by changing the back rake on the cutting elements. In single point tools when a cutting element vibrates or chatters, it places small nicks in the workpiece. When the nick returns to the cutting element, it falls into it thus causing an uneven load and more vibration is started. Some of these nicks are eliminated by tandem tools. When a nick caused by cutting element 8A in FIGURE 1 comes to 8B the cutting element 8A will support 8B. Likewise when a nick made by 8B comes to 8A then 8B will support it. The cutting action can still further be improved by using different back rakes on the cutting elements. Cutting elements having different back rakes cause nicks with different angles on the metal that is being removed from the workpiece. A cutting element having one rake can not easily fall into a nick made at a different angle. Therefore by using different back rakes on tandem cutting elements a smoother cutting action results.

There may be some who think that the method described above is the same as placing cutting elements at 180 degrees to each other on opposite sides of the workpiece. That is using cutting element 8B and a cutting element 180 degrees to it. That method has disadvantages to it. It does not provide space for cutting elements on the back side of the carriage for facing, grooving and etc. The cutting action is also not as good on some workpieces. When chatter does occur with cutting elements on opposite sides, nicks are placed on both sides of the workpiece. When both nicks come to the cutting elements again more vibration will be started. In other words one cutting element does not support the other cutting element in cutting out nicks. From the above it is believed that offsetting one cutting edge with respect to an adjacent cutting edge in the direction of feed, and positioning the cutting elements so they are not symmetrical about the workpiece according to the formula given above will provide a lathe with a better cutting action on some work pieces, and space on the back side of the lathe for performing other operations.

The above has shown how two or more tandem cutting elements will automatically adjust themselves for turning workpieces having different size diameters. It has also been shown how much more metal can be removed by the method described, how one cutting element will support another cutting element to give a better cutting action, how chatter and vibration can be reduced by applying a more uniform load to the workpiece, how harder cutting elements such as ceramics can be used more extensively, how rollers or steady rest tools can be substituted for cutting elements to provide an automatic adjusting steady rest, how burnishing and turning can be done on a workpiece having more than one diameter in one operation, how a lathe can automatically burnish and work harden workpieces having more than one diameter, and how workpieces can be machined with greater uniformity. It is believed this is a new process of cutting that will greatly reduce the cost of lathe work.

Various embodiments of the invention may be employed within the scope of the accompanying claims, which will particularly point out and distinctly set forth the subject matter regarded as the invention.

I claim:

1. In a lathe having a center of rotation, a carriage, a slide mounted on a carriage, an ordinary cutting element on the slide and an auxiliary simultaneous adjusting holder; said auxiliary adjusting holder comprising a holder containing an auxiliary cutting element, said auxiliary adjusting holder being mounted on a slide attached to the carriage, said auxiliary cutting element having a space between it and the ordinary cutting element to provide space for chips, said auxiliary cutting element is held substantially the same distance from the lathe's center of rotation as the standard cutting element, said holders being oriented in an over and under relationship on the same side of the said center of rotation, means of adjusting the cutting elements in a direction the cutting elements move whereby the lower cutting element can be offset beyond the cutting element above it an amount equivalent to approximately the thickness of chip to be cut, said auxiliary cutting element being movable toward or away from the lathe's center of rotation by a mechanical means provided for that purpose, said mechanical means being connected to the slide on which the ordinary cutting element is mounted whereby when the ordinary cutting element moves toward or away from the lathe's center of rotation said auxiliary cutting element will move a similar distance towards or away from the center of rotation.

2. A lathe having three automatic adjusting tandem cutting elements for turning workpieces having more than one diameter and a space on the back of the lathe for auxiliary cutting elements, comprising a lathe having a carriage, said carriage having three cutting elements that are held substantially the same distance from the lathe's center of rotation, one of said cutting elements is mounted on the cross slide of said carriage, each of said other two cutting elements is mounted on a separate auxiliary slide that is attached to the carriage, each of said separate auxiliary slides having a cam mechanism that is connected to the cross slide of the carriage thereby said cam mechanism on each auxiliary slide provides a means for moving the cutting elements on the auxiliary slides substantially the same distance towards or away from the lathe's center of rotation as the cutting element on the cross slide is moved whereby all the cutting elements will be moved towards or away from the center of rotation simultaneously, said lathe having a means for adjusting said cutting elements whereby each cutting element after the first will be offset from the one above it in the direction the cutting elements move when cutting and said lathe having means for moving the carriage along the workpiece axis at a speed per revolution of the workpiece that will cause each of said cutting elements to cut a segment from the workpiece that is approximately one third the distance that the carriage advances the cutting elements.

References Cited by the Examiner

UNITED STATES PATENTS

| | | | |
|---|---|---|---|
| 149,020 | 3/74 | Wood | 29—27 |
| 338,291 | 3/86 | O'Neil | 82—25 X |
| 452,495 | 5/91 | Linder | 82—25 X |
| 605,504 | 6/98 | Muncaster | 82—35 |
| 613,598 | 11/98 | Pearson | 82—35 |
| 1,164,593 | 12/15 | Bosler | 82—25 X |
| 1,182,135 | 5/16 | Bosler | 82—25 |
| 1,191,305 | 7/16 | Hendrickson | 82—25 |
| 1,228,570 | 6/17 | Kupp | 82—35 |
| 1,420,683 | 6/22 | Bright | 29—27 |
| 1,517,175 | 11/24 | Scott | 82—35 |
| 1,608,669 | 11/26 | Prydz | 82—35 |
| 1,724,285 | 8/29 | King | 82—25 |
| 1,830,027 | 11/31 | Hayden | 82—1 |
| 1,949,512 | 3/34 | Norton | 29—28 |
| 1,976,092 | 10/34 | Howard | 82—25 |
| 2,069,426 | 2/37 | Smith | 82—35 |
| 2,141,466 | 12/38 | Groene | 82—1 |
| 2,144,955 | 1/39 | Antonelli | 82—25 |
| 2,238,019 | 4/41 | Floeter | 82—25 |
| 2,319,741 | 5/43 | Lovely | 82—25 X |
| 2,351,892 | 6/44 | Welbury | 82—25 |
| 2,470,304 | 5/49 | Groene | 82—25 |
| 2,499,509 | 3/50 | Kendall | 82—25 |
| 2,559,360 | 7/51 | Kurzweil | 29—90 |
| 2,935,784 | 5/60 | Dombrowski | 29—90 |

FOREIGN PATENTS 19,607  10/01  Great Britain.

WILLIAM W. DYER, JR., *Primary Examiner.*